(12) United States Patent
Ji et al.

(10) Patent No.: US 10,095,207 B2
(45) Date of Patent: Oct. 9, 2018

(54) SYSTEM AND METHOD OF ENERGY MANAGEMENT CONTROL

(71) Applicants: Kun Ji, Plainsboro, NJ (US); Yan Lu, West Windsor, NJ (US); Zhen Song, Plainsboro, NJ (US)

(72) Inventors: Kun Ji, Plainsboro, NJ (US); Yan Lu, West Windsor, NJ (US); Zhen Song, Plainsboro, NJ (US)

(73) Assignee: SIEMENS CORPORATION, Iselin, NJ (US)

(*) Notice: Subject to any disclaimer, the term of this patent is extended or adjusted under 35 U.S.C. 154(b) by 479 days.

(21) Appl. No.: 13/763,870

(22) Filed: Feb. 11, 2013

(65) Prior Publication Data

US 2013/0231792 A1  Sep. 5, 2013

Related U.S. Application Data

(60) Provisional application No. 61/606,630, filed on Mar. 5, 2012.

(51) Int. Cl.
| | |
|---|---|
| *G05B 19/02* | (2006.01) |
| *G05B 15/02* | (2006.01) |
| *G05D 23/19* | (2006.01) |
| *F24F 11/30* | (2018.01) |
| *F24F 11/62* | (2018.01) |

(Continued)

(52) U.S. Cl.
CPC ............ *G05B 19/02* (2013.01); *F24F 11/30* (2018.01); *F24F 11/62* (2018.01); *G05B 15/02* (2013.01); *G05D 23/1923* (2013.01); *F24F 11/65* (2018.01); *F24F 2120/10* (2018.01); *F24F 2130/00* (2018.01); *F24F 2130/10* (2018.01); *G05B 2219/2642* (2013.01)

(58) Field of Classification Search
None
See application file for complete search history.

(56) References Cited

U.S. PATENT DOCUMENTS

| | | | |
|---|---|---|---|
| 2003/0036820 A1 | 2/2003 | Yellepeddy et al. | |
| 2009/0302996 A1* | 12/2009 | Rhee | H02J 13/0075 340/3.32 |
| 2012/0179298 A1* | 7/2012 | Ha | 700/276 |

FOREIGN PATENT DOCUMENTS

| | | |
|---|---|---|
| EP | 2 325 707 A1 | 5/2011 |
| WO | 03/090038 A2 | 10/2003 |
| WO | 2011/012607 A1 | 2/2011 |

OTHER PUBLICATIONS

Pang et al., "A framework for simulation-based real-time whole building performance assessment", Elsevier 2012.*

(Continued)

*Primary Examiner* — Carlos Ortiz Rodriguez (57) ABSTRACT

A method of controlling energy consumption in a building includes receiving occupancy data including at least one of occupant request data and occupant schedule data, receiving weather data including at least one of current weather measurement data and weather forecast data, generating an output control signal based on the occupancy data and the weather data, and transmitting the output control signal to a building automation system (BAS) of the building. The occupant request data includes a current request, and the occupant schedule data includes a predicted occupant schedule. The output control signal adjusts a building control device in a zone in the building.

18 Claims, 8 Drawing Sheets

(51) Int. Cl.
    *F24F 120/10*     (2018.01)
    *F24F 130/00*     (2018.01)
    *F24F 130/10*     (2018.01)
    *F24F 11/65*     (2018.01)

(56) References Cited

OTHER PUBLICATIONS

International Search Report dated Jun. 6, 2013.
Gyalistras, D. & Gwerder, M. (Eds.) (2010). "Use of weather and occupancy forecasts for optimal building climate control (OptiControl): Two years progress report." Terrestrial Systems Ecology ETH Zurich, Switzerland and Building Technologies Division, Siemens Switzerland Ltd., Zug, Switzerland, 158 pp, Appendices. ISBN 978-3-909386-37-6.; 2009; CH; May 1, 2009.

\* cited by examiner

SYSTEM AND METHOD OF ENERGY MANAGEMENT CONTROL

CROSS-REFERENCE TO RELATED PATENT APPLICATION

This application claims priority to and the benefit of Provisional Application Ser. No. 61/606,630, filed on Mar. 5, 2012, the disclosure of which is incorporated by reference herein in its entirety.

GOVERNMENT INTERESTS

This invention is partially supported by the U.S. Department of Energy under Grant DE-EE-0003843. The U.S. Government has certain rights in this invention.

BACKGROUND

1. Technical Field

The present disclosure relates to energy management control, and more particularly, to energy management control framework of optimization control and operation for energy efficient buildings.

2. Discussion of Related Art

Building control and operation is shifting from reactive control strategies to proactive control strategies. The energy performance of a building may be affected by dynamic disturbances evolving at different time scales. These disturbances include, for example, load demands, energy prices, and weather conditions.

Building control and operation may be proactively managed using a building automation system (BAS). A BAS is a system used by the control system of a building to monitor and control various systems (e.g., mechanical, electronics, and lighting systems) in the building. For example, a BAS may be used to keep the temperature in the building within a specified range, turn lighting systems on or off during certain times, etc. A BAS generally operates according to a fixed schedule, maximum occupancy assumptions, and fixed occupant comfort ranges at all times, and does not utilize all available information when managing energy consumption in a building.

BRIEF SUMMARY

According to an exemplary embodiment of the present disclosure, a method of controlling energy consumption in a building includes receiving occupancy data including at least one of occupant request data and occupant schedule data. The occupant request data may include a current request, and the occupant schedule data may include a predicted occupant schedule. The method further includes receiving weather data including at least one of current weather measurement data and weather forecast data, and generating an output control signal based on the occupancy data and the weather data. The output control signal is configured to adjust a building control device in a zone in the building. The method further includes transmitting the output control signal to a building automation system (BAS) of the building.

The method may further include receiving energy price data comprising at least one of current energy price data and predicted energy price data. Generating the output control signal may further be based on the energy price data.

The method may further include determining a peak energy load time based on the energy price data. The output control signal may further be configured to pre-cool or pre-heat the building during a time that does not correspond to the peak energy load time.

The method may further include receiving a facility management rule. Generating the output control signal may further be based on the facility management rule.

The method may further include generating a notification indicating that the current request does not comply with the facility management rule upon determining that the current request does not comply with the facility management rule, and transmitting the output control signal to the BAS upon determining that the current request complies with the facility management rule, wherein the output control signal reflects the current request.

The method may further include transmitting the output control signal to the BAS upon determining that the current request does not comply with the facility management rule, wherein the output control signal reflects a closest value relative to the current request that complies with the facility management rule.

The zone may correspond to a room in the building, or to an area in the building including two or more rooms.

The output control signal may include a set-point corresponding to a target temperature, and the building control device may be a thermostat.

The output control signal may include a set-point corresponding to a target luminance value, and the building control device may be a lighting system.

The method may further include setting a schedule for receiving at least one of the occupancy data, the weather data, and the energy price data.

At least one of the occupancy data, the weather data, and the energy price data may be received from a remote database.

According to an exemplary embodiment of the present disclosure, a method of controlling energy consumption in a building includes receiving occupant request data including a plurality of requests. Each of the plurality of requests corresponds to one of a plurality of zones in the building. The method further includes receiving occupant schedule data including a plurality of predicted occupant schedules. Each of the plurality of predicted occupant schedules corresponds to one of the plurality of zones in the building. The method further includes receiving weather data including at least one of current weather measurement data and weather forecast data, and generating a plurality of output control signals. Each of the plurality of output control signals is based on one of the plurality of requests and one of the plurality of predicted occupant schedules, and each of the plurality of output control signals is configured to adjust building control devices in the plurality of zones in the building. The method further includes transmitting the output control signal to a building automation system (BAS) of the building.

According to an exemplary embodiment of the present disclosure, an energy management controller includes a run-time module configured to receive occupant schedule data including a predicted occupant schedule, and weather data including at least one of current weather measurement data and weather forecast data. The controller further includes a human-machine interface (HMI) configured to receive occupant request data comprising a current request. The controller further includes an interface module configured to receive an output control signal from the run-time module and transmit the output control signal to a building automation system (BAS) of a building. The output control signal is based on the occupant schedule data, the weather data, and the occupant request data, and the output control signal is configured to adjust a building control device in a zone in the building.

BRIEF DESCRIPTION OF THE SEVERAL VIEWS OF THE DRAWINGS

The above and other features of the present invention will become more apparent by describing in detail exemplary embodiments thereof with reference to the accompanying drawings, in which.

DETAILED DESCRIPTION

Exemplary embodiments of the present disclosure now will be described more fully hereinafter with reference to the accompanying drawings. This disclosure, may however, be embodied in many different forms and should not be construed as limited to embodiments set forth herein.

According to exemplary embodiments of the present disclosure, an energy management control (EMC) system is utilized to permit a building automation system (BAS) to utilize different, externally available information to proactively control, and optimize energy management. A BAS is a system used by the control system of a building to monitor and control various systems in the building. For example, a BAS communicates with building control devices in the building to manage the energy consumption in the building. The types of information utilized by the EMC system include, for example, weather information, occupancy information, and energy market price information. By integrating this available, useful information, energy consumption may be decreased, and occupant comfort may be increased in a building.

Figure 1:
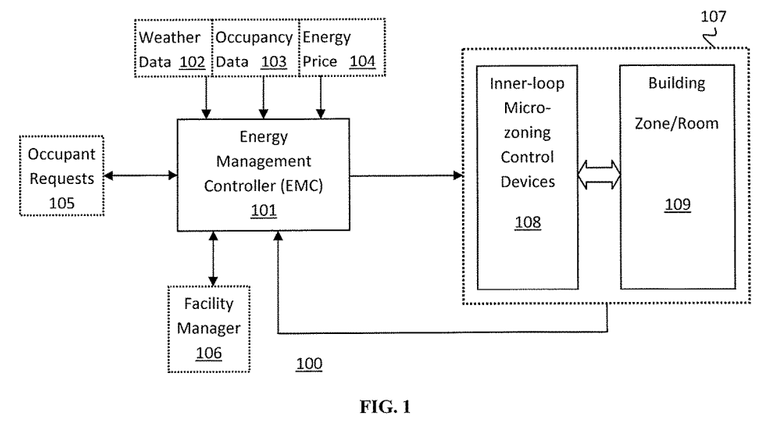
FIG. 1 shows an energy management control (EMC) system, according to an exemplary embodiment of the present disclosure.

FIG. 1 shows an energy management control (EMC) system 100, according to an exemplary embodiment of the present disclosure.

In FIG. 1, an energy management controller 101 receives data, including, for example, weather data 102, occupancy data 103, and energy price data 104. The weather data may include current weather measurement data (e.g., the current temperature) and weather forecast data (e.g., a prediction of the temperature over an upcoming time period). The occupancy data may include occupant request data and occupant schedule data. The occupant request data is data input by an occupant, and corresponds to a current request made by the occupant. For example, an occupant may request that the temperature in a zone in the building be set to a specific temperature value. The occupant schedule data is data reflecting a predicted occupant schedule for a building. For example, a building may include different zones, and each zone may have corresponding occupant schedule data. The occupant schedule data may be based on a prediction of the number of occupants that will be present in certain zones of the building at certain times, as well as certain tasks, which require certain levels of energy consumption, that are scheduled to be performed in certain zones of the building at certain times. Energy price data may include current energy price data (e.g., a real-time energy price) and/or predicted energy price data for future time periods. A zone in the building may correspond to a single room in the building, or to an area in the building including several rooms.

The data may be input to the energy management controller 101 via a variety of means, and is used by the EMC system 100 for optimal planning and operation of the BAS. For example, in an exemplary embodiment, the EMC system 100 may include input means such as, for example, a touchscreen, a keyboard, a mouse, etc., and a user can manually input the different types of data. In an exemplary embodiment, the EMC system 100 may retrieve the data from a database, or a plurality of databases. The database(s) may be located separately from the EMC system 100, and the EMC system 100 may communicate with the database(s) via a network connection (e.g., a wired connection or a wireless connection). The data may be received automatically or manually by a user. For example, a user may set a schedule regarding the frequency at which the data is retrieved. In addition, the EMC system 100 may receive occupant requests at block 105 and rules from a facility manager at block 106. Based on the received data and input received from an occupant and/or a facility manager, the EMC system 100 outputs control signals. The output control signals may include, for example, set-points of zone temperature, humidity, and luminance, and schedules of building control devices such as, for example, a thermostat, HVAC (heating, ventilation and air conditioning), windows, and lights.

During operation, the EMC system 100 may implement a dual-loop structure. For example, the EMC system 100 may utilize an inner loop and an outer loop. The inner loop is shown at block 107 of FIG. 1, and enables micro-zoning and performs local optimization of the building control devices (block 108) (e.g., HVAC, lighting, windows, etc.) within the building used to comply with the set-point requirements output by the EMC system 100. That is, the inner loop enables independent control of low level building control devices (block 108) in individual zones in the building (block 109). A zone in the building may correspond to a single room in the building, or to an area in the building including several rooms. Micro-zoning refers to individually managing different building control devices in different zones of the building to optimize energy consumption in the building. An energy consumption profile may be transmitted from the inner loop to the energy management controller 101, allowing the energy management controller 101 to make adjustments to the output control signal transmitted to the inner loop. The output control signal may include, for example, set-points, modes, and schedules. The outer loop functions as a control loop for the main framework of the EMC system 100, serving as a high level strategy planner, enabling the BAS to perform a variety of functions. For example, the outer loop may enable the BAS to utilize data including, for example, weather data 102, occupancy data 103, and energy price data 104 to configure an energy saving strategy and implement the strategy in real-time. The outer loop may further enable the BAS to exploit the building's thermal storage capacity for load shaping, coordinate occupants' real-time requests for micro-zoning, plan natural ventilation and cooling, and predict a daily energy demand profile for automatic demand response. The outer loop communicates with the inner loop via an interface module 205, as described with reference to FIG. 2.

Figure 2:
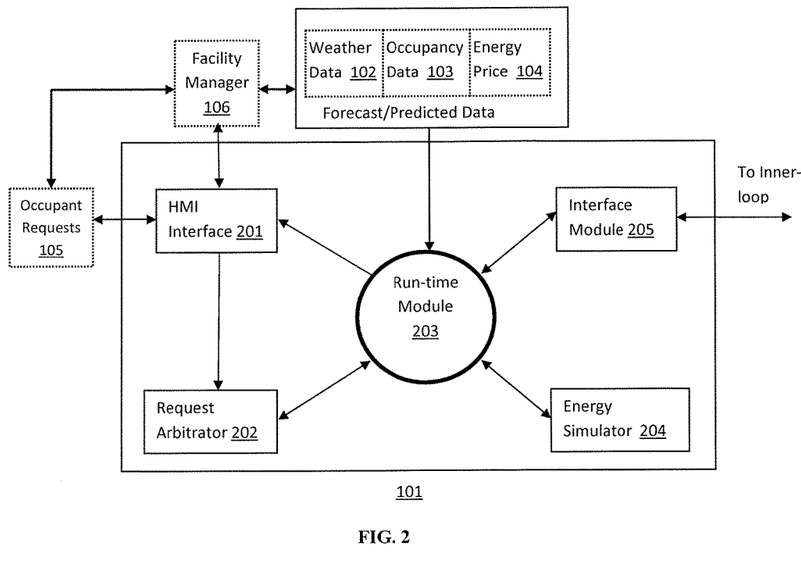
FIG. 2 shows the energy management controller of FIG. 1, according to an exemplary embodiment of the present disclosure.

FIG. 2 shows the energy management controller 101 of FIG. 1, according to an exemplary embodiment of the present disclosure.

As shown in FIG. 2, the energy management controller 101 may include a number of components. A human-machine interface (HMI) 201 is utilized to communicate with occupants and the facility manager to receive requests (e.g., from the occupants) and rules (e.g., from the facility manager). The HMI 201 may aggregate the requests and rules to facilitate optimal planning and operation of the BAS. The HMI 201 may be implemented in a variety of manners. For example, the HMI 201 may be a dedicated web-based HMI, providing occupants with a convenient and easily accessible interface to control certain zones and rooms in the building. The web-based HMI may be accessed via any network connected device including, for example, a computer, a tablet computer, a smartphone, etc. The HMI 201 may include the capability of storing task schedules and preferences associated with the tasks. The facility manager may utilize the HMI 201 to receive information relating to the occupants' preferences, task schedules, and demand response request (e.g., a request from a utility company to reduce energy consumption during periods of high demand), allowing the facility manager to implement rules of operations and decisions during a demand response period (e.g., decreasing energy consumption).

A request arbitrator 202 receives requests input by the occupant and rules input by the facility manager, and implements the requests based on the rules. The requests that comply with the rules may be implemented by the EMC system 100. For example, if a user inputs a request that a temperature in a zone of a building be set to 75 degrees, and the rules input by the facility manager specify that the temperature stay within a range of 76 degrees and 78 degrees, the request arbitrator 202 will not implement the user's request since it is not in compliance with the rules. That is, in an exemplary embodiment, if a request is made that is not in compliance with the rules, the request is not implemented. Alternatively, if the request is not in compliance with the rules, the request arbitrator 202 may implement an alternate change based on the non-compliant request. For example, if a user inputs a request that a temperature in a zone of a building be set to 75 degrees, and the rules input by the facility manager specify that the temperature stay within a range of 76 degrees and 78 degrees, the request arbitrator 202 may set the temperature to the compliant value closest to the user's non-compliant request (e.g., in the present example, the request arbitrator 202 may set the temperature to 76 degrees). In this case, the request arbitrator 202 may generate a notification to be presented to the user, informing the user that his or her initial request was non-compliant, and informing the user that an adjustment was made based on the closest compliant value to the user's non-compliant request.

Figure 3:
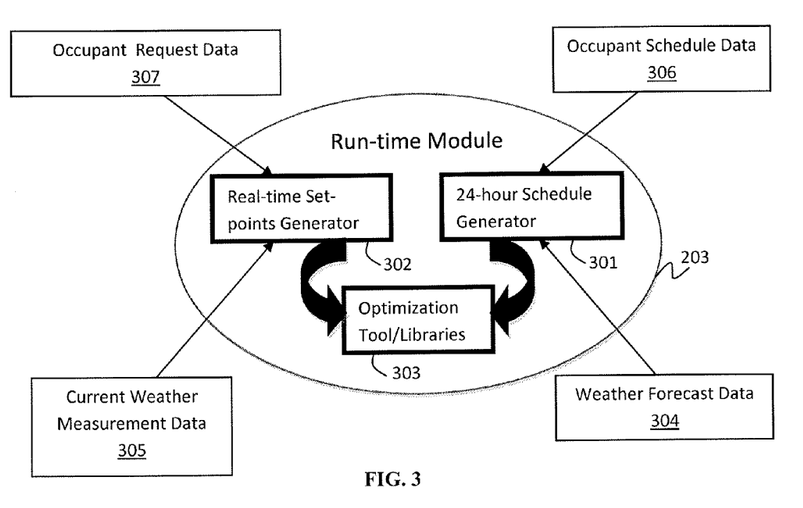
FIG. 3 shows the EMC run-time module of FIG. 2, according to an exemplary embodiment of the present disclosure.

FIG. 3 shows the EMC run-time module 203 of FIG. 2, according to an exemplary embodiment of the present disclosure.

The EMC run-time module 203 generates EMC strategies based on input received by the EMC system 100. As described above, the input may include, for example, weather data 102, occupancy data 103, and energy price data 104. In an exemplary embodiment, the EMC run-time module 203 includes a default schedule generator 301, a real-time set-points generator 302, and an optimization tool/libraries module 303.

The default schedule generator 301 generates a default schedule including set-points for pre-determined intervals for every zone in the building. The default schedule corresponds to an optimal schedule as determined by the default schedule generator 301. The default schedule generator 301 may be configured to generate a new schedule for any time interval. For example, the default schedule generator 301 may be configured to generate a new schedule every 24 hours, however the time interval is not limited thereto. Further, the pre-determined intervals for the set-points for every zone in the building may be customized. For example, set-points for each zone may be set to update every hour, however the intervals are not limited thereto. In addition, the set-points for different zones and for different building control devices may be set to update at different intervals. For example, the temperature in a first and second zone may be set to update every 1 hour, the temperature in a third zone may be set to update every 3 hours, the lighting system in the first zone may be set to update every 8 hours, and the lighting system in the second and third zones may be set to update every 12 hours.

The default schedule generated by the default schedule generator 301 is based on certain weather data 102 and certain occupancy data 103. For example, the weather data 102 may include both weather forecast data 304 and current (e.g., real-time) weather measurement data 305, and the occupancy data 103 may include both occupant schedule data 306 (e.g., predicted occupant schedules and tasks) and occupant request data 307 (e.g., current requests made by an occupant(s) in real-time). The default schedule generator 301 may utilize the weather forecast data 304 and the occupant schedule data 306 to generate the default schedule. The default schedule generator 301 receives the occupant schedule data 306 from the HMI 201. This schedule may be used by the BAS as the default schedule. For example, the default schedule generated by the default schedule generator 301 may be applied to the BAS when no new real-time set-points are provided by the real-time set-points generator 302.

The real-time set-points generator 302 generates set-points based on the real-time occupant request data 307 and the real-time weather measurement data 305. For example, as the real-time set-points generator 302 receives requests from an occupant and receives real-time weather measurement data, the real-time set-points generator 302 generates set-points that override the default schedule generated by the default schedule generator 301. The EMC run-time module 203 may seamlessly transition between applying the default schedule to the BAS when no set-points have been generated by the real-time set points generator 302, and making adjustments to the default schedule when occupant requests and/or real-time weather measurement data is received.

The default schedule generator 301 and the real-time set-points generator 302 may both utilize the optimization tool/libraries module 303 and an energy simulator 204 of the energy management controller 101 to perform optimization related simulation to determine optimal schedules and set-points. For example, the optimization tool/libraries module 303 may be utilized to perform different types of optimization, including, for example, heuristic search based optimization, and may utilize the energy simulator 204 to implement the optimization process.

Referring to FIG. 2, the energy simulator 204 simulates different EMC strategies and determines which strategy is the most energy efficient. The energy simulator 204 may utilize existing energy simulation software such as, for example, EnergyPlus. The energy simulator 204 may communicate with the optimization tool/libraries module 303 of the EMC run-time module 203 to determine an optimized strategy. The energy simulator 204 may utilize characteristics of the building, which may be input by a user (e.g., the facility manager), to simulate different EMC strategies. The building characteristics may include, for example, the building's physical makeup, including the physical makeup of specific rooms and zones, a description of the different types and locations of building control devices in the building, etc.

The interface module 205 is a channel allowing the outer loop to communicate with the inner loop. Once an EMC strategy is determined and selected by the EMC system 100 in the outer loop, this strategy is communicated to the inner loop, and the inner loop applies the strategy via local optimization of the building control devices within the building.

As described above, the EMC system 100 allows for the determination, simulation, and application of different EMC strategies, each of which may result in different energy/cost savings. Various EMC strategies according to exemplary embodiments of the present disclosure, and corresponding simulation results, are described below. The location for the simulations was Carnegie Mellon University. The EMC strategies may be compared to a baseline control strategy, in which a fixed schedule and fixed set-points are utilized at all times in the building. The simulated results indicate certain energy consumption savings. These energy consumption savings are illustrative, and exemplary embodiments are not limited to the energy consumption savings of the simulations.

Figure 4:
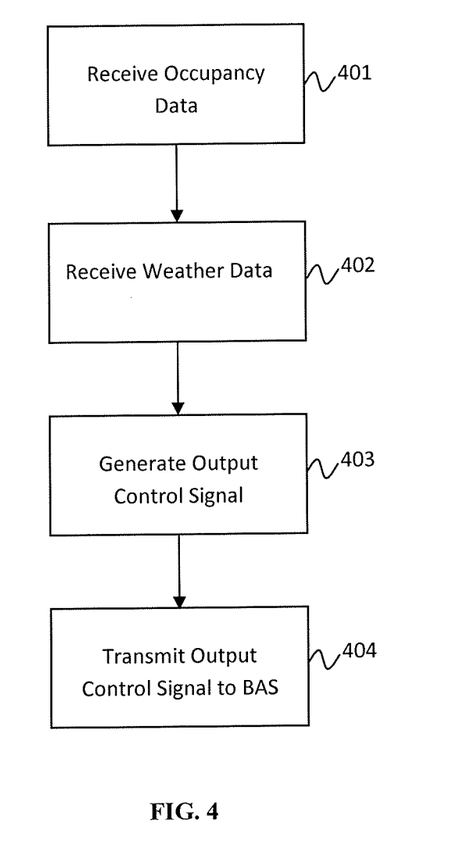
FIG. 4 is a flowchart showing a method of controlling energy consumption in a building, according to an exemplary embodiment of the present disclosure.

FIG. 4 is a flowchart showing a method of controlling energy consumption in a building, according to an exemplary embodiment of the present disclosure.

At block 401, occupancy data is received by the EMC system 100. The occupancy data may include occupant request data and/or occupant schedule data. As described above, the occupant request data may include a current request made by an occupant, and the occupant schedule data may include a predicted occupant schedule based on occupants in the building and tasks to be completed in the building. At block 402, weather data is received by the EMC system 100. As described above, the weather data may include current (e.g., real-time) weather measurement data and weather forecast data. At block 403, the EMC system 100 generates an output control signal. The output control signal is based on the received occupancy data and weather data, and is configured to adjust a building control device in a zone in the building. At block 404, the output control signal is transmitted to the BAS.

Figure 5:
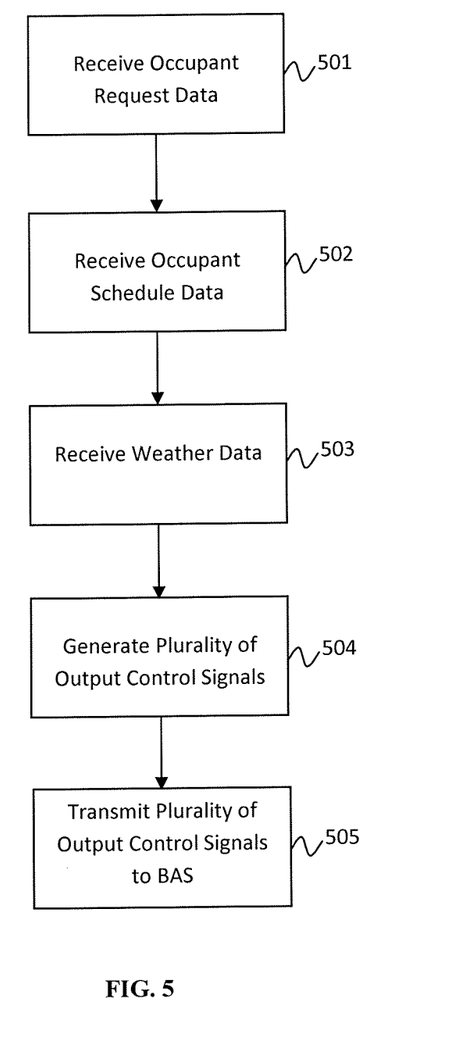
FIG. 5 is a flowchart showing a method of controlling energy consumption in a building, according to an exemplary embodiment of the present disclosure.

FIG. 5 is a flowchart showing a method of controlling energy consumption in a building, according to an exemplary embodiment of the present disclosure.

At block 501, occupant request data is received by the EMC system 100. The occupant request data may include a plurality of requests, each of which correspond to one of a plurality of zones in the building. At block 502, occupant schedule data is received by the EMC system 100. The occupant schedule data may include a plurality of predicted occupant schedules, each of which corresponds to one of the plurality of zones in the building. At block 503, weather data is received by the EMC system 100. The weather data may include current weather measurement data and/or weather forecast data. At block 504, a plurality of output control signals are generated by the EMC system 100. Each of the plurality of output control signals is based on one of the plurality of requests and one of the plurality of predicted occupant schedules, and each of the output control signals is configured to adjust building control devices in the plurality of zones in the building. At block 505, the output control signals are transmitted to the BAS. As a result, micro-zoning may be performed.

According to an exemplary embodiment, a time of day control strategy may be implemented by the EMC system 100. The time of day control strategy is based on a business hours schedule in which fixed set-points are utilized during business hours. For example, if typical business hours for a building are defined as 9:00 am to 5:00 pm, fixed set-points increasing energy use may be implemented at the start of the business day (e.g., 9:00 am), and fixed set-points decreasing energy use may be implemented at the end of the business day (e.g., 5:00 pm). The time of day control strategy is not limited to business hours. For example, the time of day strategy may be utilized in a home setting using different, fixed set-points utilized during different hours (e.g., hours corresponding to the typical time occupants' are home).

Figure 6A:
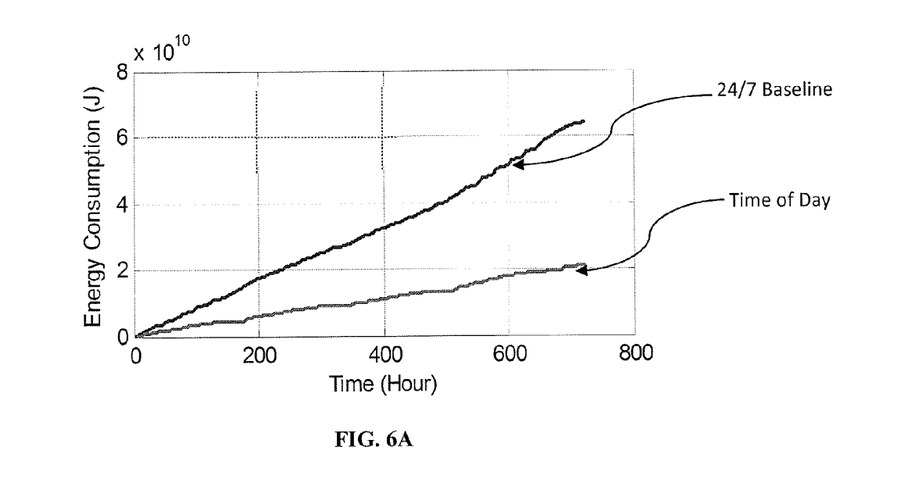
FIGS. 6A and 6B show simulated results indicating a monthly accumulated energy consumption comparison of a baseline control strategy and a time of day control strategy, according to an exemplary embodiment of the present disclosure.
Figure 6B:
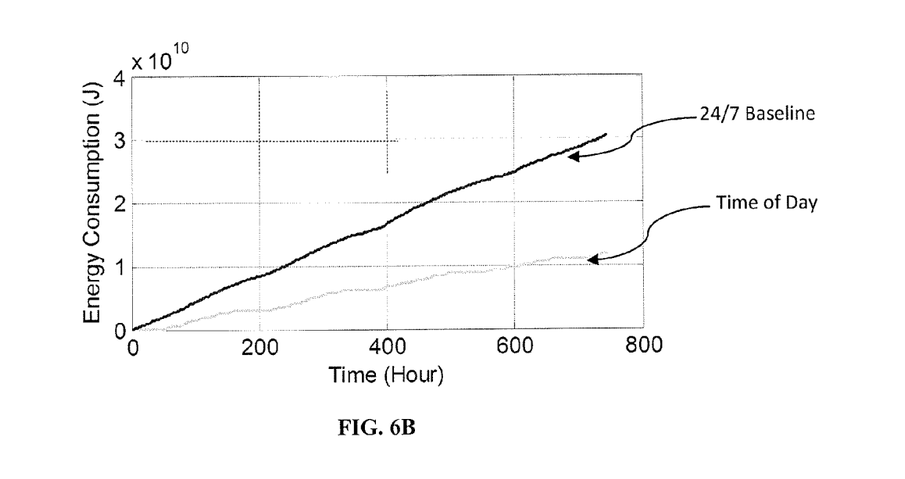

FIGS. 6A and 6B show simulated results indicating a monthly accumulated energy consumption comparison of the baseline control strategy and the time of day control strategy during January 2010 and July 2010, respectively, according to an exemplary embodiment. According to the simulated results shown in FIGS. 6A and 6B, utilization of the time of day control strategy resulted in energy consumption savings as high as 70% during winter months and 60% during summer months.

According to an exemplary embodiment, an occupancy based control strategy may be implemented by the EMC system 100. The occupancy based control strategy is based on the occupancy data 103, and utilizing different set-points based on the occupancy data 103. For example, the occupancy data 103 may indicate an occupancy schedule, as well as occupancy requests/preferences. The occupancy schedule includes information indicating at which times different zones in the building are typically occupied and unoccupied, and may also indicate the different tasks performed in the different zones at certain times. A zone may correspond to a single room in the building, or to multiple rooms in a certain area of the building. In addition to the occupancy schedule, occupancy requests/preferences may be included in the occupancy data 103. Occupancy requests/preferences include requests input to the EMC system 100 by user(s). For example, a user may request that a temperature of a certain zone be increased during certain times of day, or on different days. If this request complies with rules set by the facility manager, as described above, additional set-points may be implemented by the EMC system 100. For example, using the occupancy based control strategy, basic set-points may be initially implemented based on the occupancy schedule. Additional set-points may then be implemented based on occupant preferences and requests.

Figure 7:
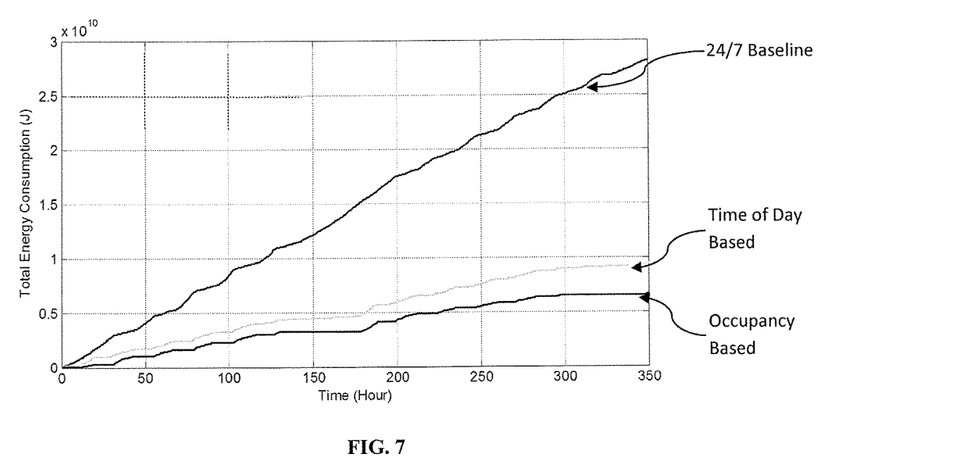
FIG. 7 shows simulated results comparing energy consumption savings of a baseline control strategy, a time of day control strategy, and an occupancy based control strategy, according to an exemplary embodiment of the present disclosure.

FIG. 7 shows simulated results comparing energy consumption savings of the baseline control strategy, the time of day control strategy, and the occupancy based control strategy, according to an exemplary embodiment. According to the simulated results shown in FIG. 7, utilization of the time of day control strategy resulted in energy consumption savings as high as 20% compared to the time of day control strategy. Energy consumption savings resulting from using the occupancy based control strategy may vary depending on the occupancy schedule (e.g., energy consumption savings will increase as the unoccupied period of a building increases).

According to an exemplary embodiment, a knowledge based control strategy (e.g., an occupancy task based control strategy) may be implemented by the EMC system 100. The occupancy based control strategy is based on the occupancy data 103 received from a user(s). For example, the occupancy data 103 may indicate an occupancy schedule, as well as occupancy task information. The occupancy schedule includes information indicating at which times the building is typically occupied and unoccupied. Further, the occupancy schedule may include information indicating at which times certain zones in the building are typically occupied and unoccupied. A zone may correspond to a single room in the building, or to multiple rooms in a certain area of the building. In addition to the occupancy schedule, occupancy task information may be included in the occupancy data 103. Occupancy task information indicates specific tasks being carried out in specific zones of the building. For example, tasks may indicate computer usage, laboratory usage, heavy reading, etc. Based on this information, set-points may be implemented to adjust the lighting in specific zones of the building based on the tasks being carried out in those zones.

Figure 8:
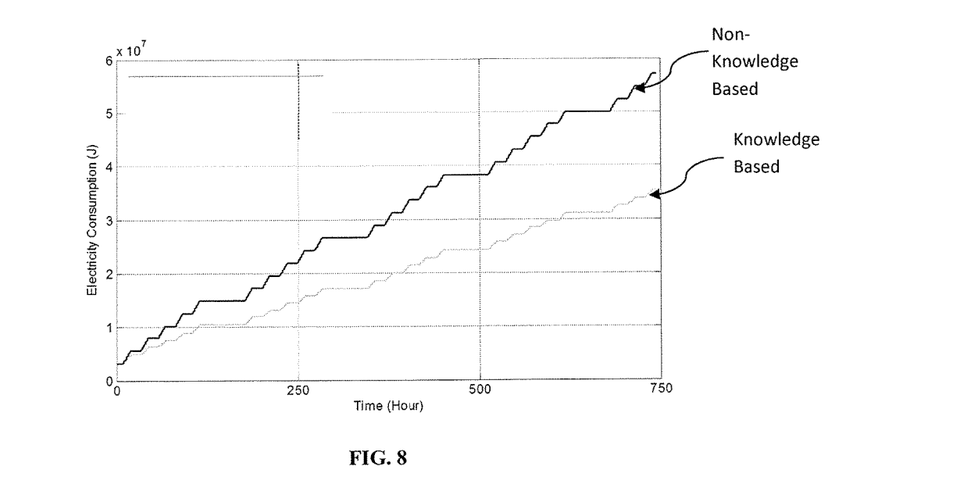
FIG. 8 shows simulated results comparing energy consumption savings of a knowledge based control strategy and a non-knowledge based control strategy, according to an exemplary embodiment of the present disclosure.

FIG. 8 shows simulated results comparing energy consumption savings of the knowledge based control strategy and a non-knowledge based control strategy, according to an exemplary embodiment. According to the simulated results shown in FIG. 8, utilization of the knowledge based control strategy resulted in energy consumption savings as high as 40% compared to a non-knowledge based control strategy. Energy consumption savings resulting from using the knowledge based control strategy may vary depending on the occupancy task information.

According to an exemplary embodiment, a weather based control strategy may be implemented by the EMC system 100. The weather based control strategy is a supplemental control strategy that can supplement any of the control strategies according to exemplary embodiments of the present disclosure. For example, the weather based control strategy may be implemented together with any of the time of day control strategy, the occupancy based control strategy, and the knowledge based control strategy. When the weather based control strategy is utilized, the EMC system 100 receives weather data 102 as an additional input, and uses this additional data to implement set-points. As a result, the current weather can be leveraged to increase energy consumption savings, as described above.

Figure 9:
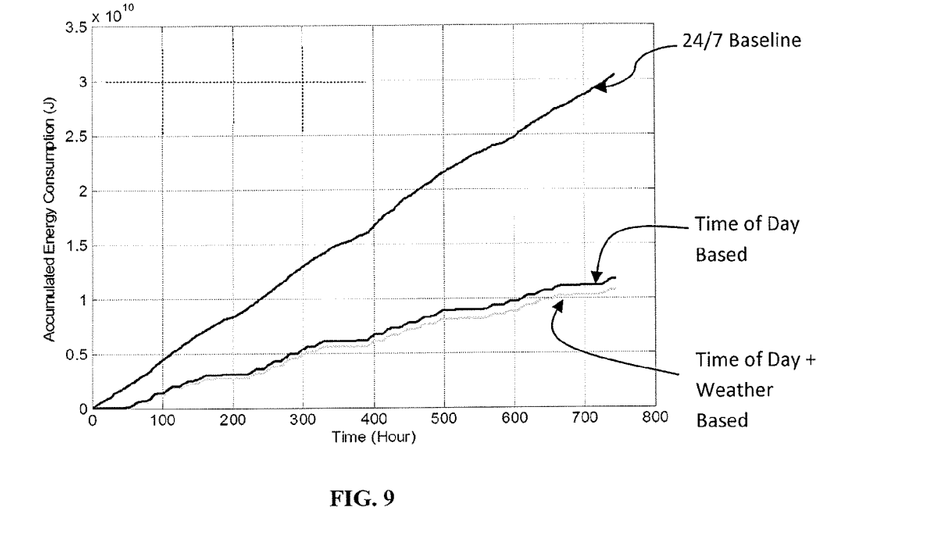
FIG. 9 shows simulated results comparing energy consumption savings of a baseline control strategy, a time of the day control strategy, and the time of day control strategy supplemented with a weather based control strategy, according to an exemplary embodiment.

FIG. 9 shows simulated results comparing energy consumption savings of the baseline control strategy, the time of the day control strategy, and the time of day control strategy supplemented with the weather based control strategy, according to an exemplary embodiment.

According to an exemplary embodiment, a load shifting control strategy may be implemented by the EMC system 100. The load shifting control strategy limits energy consumption during peak load time. Utilization of the load shifting control strategy may result in the savings of energy cost. That is, the load shifting control strategy may reduce the total energy cost by shifting the load to a time period having a cheaper energy price. For example, the load shifting control strategy includes pre-cooling or pre-heating zones of a building prior to the peak load time. A heuristic search based optimization process may be implemented to determine the optimal start time and the duration of the pre-cooling or pre-heating. An energy cost function may be defined as the sum of demand cost and energy consumption cost. The heuristic search based optimization process may utilize, for example, Particle Swamp Optimization (PSO) or a Genetic Algorithm (GA).

It is to be understood that exemplary embodiments of the present disclosure may be implemented in various forms of hardware, software, firmware, special purpose processors, or a combination thereof. In one embodiment, a method for energy management control may be implemented in software as an application program tangibly embodied on a computer readable storage medium or computer program product. As such, the application program is embodied on a non-transitory tangible media. The application program may be uploaded to, and executed by, a processor comprising any suitable architecture.

It should further be understood that any of the methods described herein can include an additional step of providing a system comprising distinct software modules embodied on a computer readable storage medium. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

Figure 10:
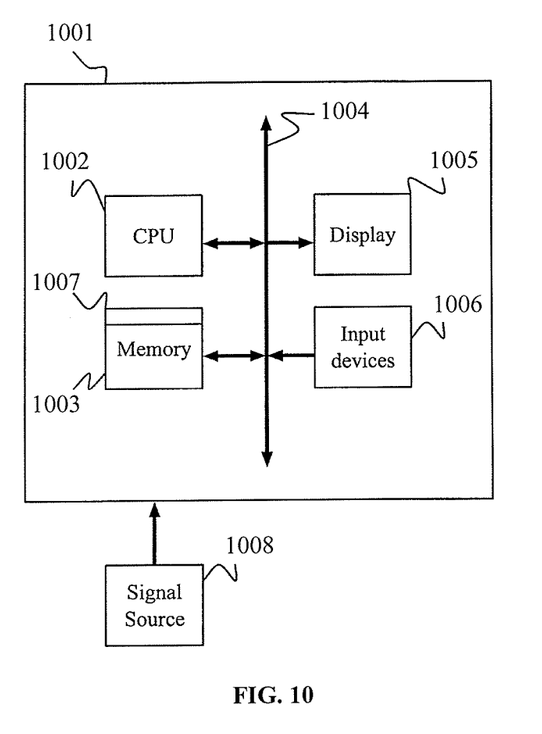
FIG. 10 shows an exemplary computer system for implementing an EMC system, according to an exemplary embodiment of the present invention.

Referring to FIG. 10, according to an exemplary embodiment of the present invention, a computer system 1001 for energy management control can comprise, inter alia, a central processing unit (CPU) 1002, a memory 1003 and an input/output (I/O) interface 1004. The computer system 1001 is generally coupled through the I/O interface 1004 to a display 1005 and various input devices 1006 such as a mouse and keyboard. The support circuits can include circuits such as cache, power supplies, clock circuits, and a communications bus. The memory 1003 can include random access memory (RAM), read only memory (ROM), disk drive, tape drive, etc., or a combination thereof. The present invention can be implemented as a routine 1007 that is stored in memory 1003 and executed by the CPU 1002 to process the signal from the signal source 1008. As such, the computer system 1001 is a general-purpose computer system that becomes a specific purpose computer system when executing the routine 1007 of the present invention.

The computer platform 1001 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present invention.

Having described exemplary herein, it is noted that modifications and variations can be made by persons skilled in the art in light of the above teachings. It is therefore to be understood that changes may be made in exemplary embodiments of the disclosure, which are within the scope and spirit of the invention as defined by the appended claims. Having thus described the present disclosure with the details and particularity required by the patent laws, what is claimed and desired protected by Letters Patent is set forth in the appended claims.

What is claimed is:

1. A method of controlling energy consumption in a building, comprising:
   receiving occupancy data comprising at least one of occupant request data and occupant schedule data by an energy management control (EMC) system, wherein the occupant request data comprises an initial request with corresponding initially requested environmental conditions received from an occupant of the building and the occupant schedule data comprises a predicted occupant schedule;
   receiving weather data comprising at least one of current weather measurement data and weather forecast data by the EMC system;
   receiving a facility management rule from a facility manager of the building by the EMC system;
   generating an output control signal based on the occupancy data, and the weather data, and the facility management rule by the EMC system, wherein the output control signal is configured to adjust a building control device in a zone in the building; and
   transmitting the output control signal to a building automation system (BAS) of the building,
   determining, whether the initial request complies with the facility management rule,
   wherein the output control signal causes the BAS to implement the initially requested environmental conditions when the initial request complies with the facility management rule, and the output control signal causes the BAS to implement alternate environmental conditions different from the initially requested environmental conditions when the initial request does not comply with the facility management rule, wherein the alternate environmental conditions are corresponding to a closest alternate request relative to the initial request and compliant with the facility management rule, and
   wherein the EMC system comprises an EMC run-time module generating EMC strategies based on the occupancy data, the weather data and the facility management rule received by the EMC system, wherein the EMC run-time module includes a default schedule generator, a real-time set-points generator and an optimization tool/libraries module, wherein the EMC run-time module seamlessly transitions between applying a default schedule generated by the default schedule generator to the BAS and adjusting the default schedule when real-time data generated by the real-time set-points generator is received, and
   wherein the default schedule generator and real-time set-points generator utilize the optimization tool/libraries module and an energy simulator to simulate the EMC strategies to determine an optimized EMC strategy, wherein characteristics of the building are utilized to simulate the EMC strategies.

2. The method of claim 1, further comprising:
   receiving energy price data comprising at least one of current energy price data and predicted energy price data, wherein generating the output control signal is further based on the energy price data.

3. The method of claim 2, further comprising:
   determining a peak energy load time based on the energy price data, wherein the output control signal is further configured to pre-cool or pre-heat the building during a time that does not correspond to the peak energy load time.

4. The method of claim 1, wherein the zone corresponds to a room in the building.

5. The method of claim 1, wherein the zone corresponds to an area in the building including two or more rooms.

6. The method of claim 1, wherein the output control signal comprises a set-point corresponding to a target temperature and the building control device is a thermostat.

7. The method of claim 1, wherein the output control signal comprises a set-point corresponding to a target luminance value and the building control device is a lighting system.

8. The method of claim 1, further comprising:
   setting a schedule for receiving at least one of the occupancy data, the weather data, and the energy price data.

9. The method of claim 1, wherein at least one of the occupancy data, the weather data, and the energy price data are received from a remote database.

10. The method of claim 1, further comprising:
    transmitting a notification to the occupant of the building upon the output control signal causing the BAS to implement the alternate environmental conditions different from the initially requested environmental conditions, wherein the notification indicates to the occupant that the alternate environmental conditions were implemented instead of the initially requested environmental conditions.

11. A method of controlling energy consumption in a building, comprising:
    receiving occupant request data comprising a plurality of initial requests from at least one occupant of the building with a plurality of corresponding initially requested environmental conditions by an energy management control (EMC) system, wherein each of the plurality of initial requests corresponds to one of a plurality of zones in the building;
    receiving occupant schedule data comprising a plurality of predicted occupant schedules by the EMC system, wherein each of the plurality of predicted occupant schedules corresponds to one of the plurality of zones in the building;
    receiving weather data comprising at least one of current weather measurement data and weather forecast data;
    receiving a facility management rule from a facility manager by the EMC system the building;
    generating a plurality of output control signals by the EMC system, wherein each of the plurality of output control signals is based on one of the plurality of initial requests, and one of the plurality of predicted occupant schedules, and the facility management rule, and each of the plurality of output control signals is configured to adjust building control devices in the plurality of zones in the building; and transmitting the output control signal to a building automation system (BAS) of the building, determining, whether the plurality of initial requests complies with the facility management rule, wherein the plurality of output control signals causes the BAS to implement the plurality of initially requested environmental conditions, when the plurality of initial requests complies with the facility management rule, and the plurality of output control signal causes the BAS to implement a plurality of alternate environmental conditions different from the plurality of initially requested environmental conditions, when the plurality of initial requests does not comply with the facility management rule, wherein the plurality of alternate environmental conditions are corresponding to a plurality of closest alternate requests relative to the plurality of initial requests and compliant with the facility management rule, and wherein the EMC system comprises an EMC run-time module generating EMC strategies based on the occupancy data, the weather data and the facility management rule received by the EMC system, wherein the EMC run-time module includes a default schedule generator, a real-time set-points generator and an optimization tool/libraries module, wherein the EMC run-time module seamlessly transitions between applying a default schedule generated by the default schedule generator to the BAS and adjusting the default schedule when real-time data generated by the real-time set-points generator is received, and wherein the default schedule generator and real-time set-points generator utilize the optimization tool/libraries module and an energy simulator to simulate the EMC strategies to determine an optimized EMC strategy, wherein characteristics of the building are utilized to simulate the EMC strategies.

12. The method of claim 11, further comprising:
receiving energy price data comprising at least one of current energy price data and predicted energy price data, wherein generating the plurality of output control signals is further based on the energy price data.

13. The method of claim 12, further comprising:
determining a peak energy load time based on the energy price data, wherein the output control signals are configured to pre-cool or pre-heat at least one of the plurality of zones in the building during a time that does not correspond to the peak energy load time.

14. The method of claim 11, further comprising:
transmitting at least one notification to the at least one occupant of the building upon the plurality of output control signals causing the BAS to implement the plurality of alternate environmental conditions different from the plurality of initially requested, wherein the at least one notification indicates to the at least one occupant that the alternate environmental conditions were implemented instead of the initially requested environmental conditions.

15. An energy management controller, comprising:
a run-time module configured to receive occupant schedule data comprising a predicted occupant schedule, and weather data comprising at least one of current weather measurement data and weather forecast data;
a human-machine interface (HMI) configured to receive occupant request data comprising an initial request with corresponding initially requested environmental conditions received from an occupant of a building, and a facility management rule from a facility manager of the building; and
an interface module configured to receive an output control signal from the run-time module and transmit the output control signal to a building automation system (BAS) of the building,
wherein the output control signal is based on the occupant schedule data, the weather data, the occupant request data, and the facility management rule, and the output control signal is configured to adjust a building control device in a zone in the building,
wherein the output control signal causes the BAS to implement the initially requested environmental conditions when the initial request complies with the facility management rule, and the output control signal causes the BAS to implement alternate environmental conditions different from the initially requested environmental conditions when the initial request does not comply with the facility management rule, wherein the alternate environmental conditions are corresponding to a closest alternate request relative to the initial request and compliant with the facility management rule, and
wherein the run-time module generates strategies based on the occupant schedule data, the weather data, the occupant request data and the facility management rule, wherein the run-time module includes a default schedule generator, a real-time set-points generator and an optimization tool/libraries module, wherein the run-time module seamlessly transitions between applying a default schedule generated by the default schedule generator to the BAS and adjusting the default schedule when real-time data generated by the real-time set-points generator is received, and
wherein the default schedule generator and real-time set-points generator utilize the optimization tool/libraries module and an energy simulator to simulate the strategies to determine an optimized strategy, wherein characteristics of the building are utilized to simulate the strategies.

16. The energy management controller of claim 15, wherein the run-time module is further configured to receive energy price data comprising at least one of current energy price data and predicted energy price data, and the output control signal is further based on the energy price data.

17. The energy management controller of claim 16, wherein the run-time module is further configured to determine a peak energy load time based on the energy price data, and the output control signal is further configured to pre-cool or pre-heat the zone in the building during a time that does not correspond to the peak energy load time.

18. The energy management controller of claim 15, wherein the HMI is further configured to receive a notification upon the output control signal causing the BAS to implement the alternate environmental conditions different from the initially requested environmental conditions, wherein the notification indicates to the occupant of the building that the alternate environmental conditions were implemented instead of the initially requested environmental conditions.

* * * * *